(12) United States Patent
Kozaki et al.

(10) Patent No.: US 7,679,248 B2
(45) Date of Patent: Mar. 16, 2010

(54) MAGNETIC BEARING SYSTEM

(75) Inventors: Junichiro Kozaki, Kyoto (JP); Masaki Ohfuji, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 331 days.

(21) Appl. No.: 11/936,514

(22) Filed: Nov. 7, 2007

(65) Prior Publication Data

US 2008/0088398 A1    Apr. 17, 2008

(51) Int. Cl.
*F16C 32/04* (2006.01)
*H01H 47/00* (2006.01)
*H02K 7/09* (2006.01)

(52) U.S. Cl. .................... 310/90.5; 310/68 B; 361/139; 361/143; 361/144

(58) Field of Classification Search ............... 310/68 B, 310/90.5; 361/139, 143, 144; 375/316, 324
See application file for complete search history.

(56) References Cited

U.S. PATENT DOCUMENTS

| | | | | |
|---|---|---|---|---|
| 4,473,259 A | * | 9/1984 | Goldowsky | 310/90.5 |
| 5,754,425 A | * | 5/1998 | Murakami | 700/40 |
| 5,844,339 A | * | 12/1998 | Schroeder et al. | 310/90.5 |
| 6,326,712 B1 | * | 12/2001 | Nakazawa et al. | 310/90.5 |
| 6,787,955 B1 | * | 9/2004 | Ueyama | 310/90.5 |
| 7,355,833 B2 | * | 4/2008 | Kozaki | 361/139 |
| 7,525,784 B2 | * | 4/2009 | Kozaki | 361/139 |
| 7,564,670 B2 | * | 7/2009 | Kozaki et al. | 361/139 |
| 2008/0088398 A1 | * | 4/2008 | Kozaki et al. | 335/295 |

FOREIGN PATENT DOCUMENTS

JP    2004-144291 A    5/2004

* cited by examiner

*Primary Examiner*—Quyen Leung
*Assistant Examiner*—David W. Scheuermann
(74) *Attorney, Agent, or Firm*—Sughrue Mion, PLLC

(57) ABSTRACT

Disclosed is a magnetic bearing system capable of simplifying a demodulation operation and reducing a processing load associated with a magnetic levitation control. A carrier signal having a frequency fc is apply to a sensor through a filter. The sensor operates to modulate the carrier signal, and a difference amplifier operates to calculate a difference between the amplitude-modulated signal $F_{AM}$ (t) and a sensor reference signal Fstd (t). An A/D converter operates to A/D convert a difference signal Fsub (t) output from the difference amplifier to a discretized sensor signal. In the A/D conversion, a sampling frequency fs is set to satisfy the following relation: fc: fc=n·fs or fc=fs/2 (n is a natural number). Thus, the discretized sensor signal includes no carrier wave, and therefore a demodulation operation which has been previously essential can be simplified.

11 Claims, 12 Drawing Sheets

MAGNETIC BEARING SYSTEM

BACKGROUND OF THE INVENTION

1. Field of the Invention

The present invention relates to a magnetic bearing system for use in a turbo-molecular pump, a machine tool or the like.

2. Description of the Related Art

A magnetic bearing system is often used in equipment requiring high-speed rotation, such as a turbo-molecular pump or a machine tool. The magnetic bearing system is designed to detect a displacement of a rotor using a displacement sensor, and feed back the detection result to control an excitation current of an electromagnet. Specifically, the displacement sensor is typically composed of an inductance type which is operable to amplitude-modulate a carrier applied thereto, depending on an impedance change resulting from a change in a gap relative to the rotor. After A/D converting the amplitude-modulated signal, the digital signal is demodulated, and the demodulated displacement signal is used for controlling the excitation current of the electromagnet (see, for example, JP 2004-144291A).

The modulated signal to be subjected to the A/D conversion has a bandwidth ranging from (fc−fr) to (fc+fr), wherein fc is a frequency of the carrier, and fr is a frequency (maximum frequency) of a displacement signal of the rotor. That is, the bandwidth (maximum frequency) of the modulated signal is 2 fr. Generally, in an operation of A/D converting an analog signal at a sampling frequency fs, it is necessary to satisfy a relation of 4 fr<fs according to the sampling theorem to prevent the occurrence of aliasing, and therefore the maximum frequency fr of the rotor displacement signal is limited to fs/4. Thus, depending on a processing speed of digital signal processor (DSP), the maximum frequency fr cannot be set at a desirably high value, resulting in poor feedback characteristics in a high frequency range.

Specifically, while it is conceivable to increase the sampling frequency fs and/or the carrier frequency as measures for avoiding the problem about deterioration in the high-frequency characteristics, these measures will inevitably impose higher processing load on a DSP, and lead to the need for a DSP operating at high frequencies, causing an increase in cost. Moreover, if the digital demodulation is performed in a conventional manner, an S/N ratio will deteriorate due to signal decay occurring during the demodulation operation, which is likely to cause vibration in the rotor which is an object to be supported.

SUMMARY OF THE INVENTION

In view of the above circumstances, it is an object of the present invention to provide a magnetic bearing system capable of simplifying a demodulation operation and achieving enhanced high-frequency characteristics while reducing a processing load associated with a magnetic levitation control.

In order to achieve the above object, as set forth in the appended claim 1, the present invention provides a magnetic bearing system designed to support an object by an electromagnet in a non-contact manner. The magnetic bearing system comprises carrier generation means for generating a carrier signal, detection means for modulating the carrier signal depending on a support position of the object, and outputting a modulated signal, A/D conversion means for converting the modulated signal output from the detection means, to a digital signal at a sampling frequency which satisfies the following relation: fc=n·fs, or fc=fs/2 (wherein: fc is a carrier frequency of the carrier signal; fs is the sampling frequency; and n is a natural number); and control means for controlling an excitation current of the electromagnet based on the digital signal output from the A/D conversion means, to control the support position of said object.

As set forth in the appended claim 2, in the magnetic bearing system set forth in the appended claim 1, the carrier generation means may include a sinusoidal-discrete-sequence generation section for generating a sinusoidal discrete sequence through a digital processing, a D/A conversion section for D/A converting the sinusoidal discrete sequence to generate the carrier signal, and a phase-shift operation section for phase-shifting the sinusoidal discrete sequence through a digital processing. In this case, the A/D conversion means may be operable, based on the phase-shifted sinusoidal discrete sequence from the phase-shift operation section, to conform a timing for converting the modulated signal to a digital signal, approximately to an envelope of the modulated signal.

When the magnetic bearing system is a multi-axis control-type magnetic bearing system having a plurality of control axes, the detection means may be operable to modulate the carrier signal with respect to each of the plurality of control axes, and output a plurality of modulated signals corresponding to said respective control axes. Further, the A/D conversion means may be operable to (a) A/D convert each of the modulated signals output from the detection means, in synchronization with a carrier component of each of the modulated signals which is changed at the carrier frequency, wherein (b) a first one of the two of the modulated signals is sampled approximately synchronously with a timing when the carrier component of the first modulated signal becomes maximum, and a second one of the two modulated signals is sampled approximately synchronously with a timing when the carrier component of the second modulated signal becomes minimum.

When the magnetic bearing system is a multi-axis control-type magnetic bearing system having a plurality of control axes, the detection means may be operable to modulate the carrier signal with respect to each of the plurality of control axes, and output a plurality of modulated signals corresponding to said respective control axes. Further, the A/D conversion means may be operable to A/D convert each of the modulated signals output from the detection means, in synchronization with a carrier component of each of the modulated signals which is changed at the carrier frequency, wherein the modulated signal is sampled in a phase range which is 1/4 of a carrier period centered at a phase where the carrier component of the modulated signal becomes maximum or minimum.

The carrier generation means may be operable to generate a plurality of carrier signals each having a different phase and a common frequency, and the detection means may be operable to modulate the plurality of carrier signals in one-to-one correspondence to the plurality of control axes, and output a plurality of modulated signals.

The carrier generation means may include a sinusoidal-discrete-sequence generation section for generating a sinusoidal discrete sequence through a digital processing, D/A conversion means for D/A converting the sinusoidal discrete sequence generated by the sinusoidal-discrete-sequence generation section, to generate the carrier signal, and phase shift means including at least one phase shift circuit for phase-shifting the carrier signal to allow the plurality of carrier signals each having a different phase and a common frequency to be created.

The carrier generation means may include a sinusoidal-discrete-sequence generation section for generating a sinusoidal discrete sequence through a digital processing, and a plurality of D/A conversion means for D/A converting the sinusoidal discrete sequence generated by the sinusoidal-discrete-sequence generation section, to generate the plurality of carrier signals.

The A/D conversion means may be provided in plural number. In this case, the detection means is operable, when the plurality of modulated signals include two or more modulated signals each having a carrier component with a common phase, to input the two or more modulated signals, respectively, into different ones of the plurality of A/D conversion means, and the different A/D conversion means are operable to A/D convert the two or more modulated signals at a common timing.

In the present invention, the A/D conversion is performed at a sampling frequency which satisfies the following relation: fc=n·fs, or fc=fs/2, wherein: fc is a carrier frequency of the carrier signal; fs is the sampling frequency; and n is a natural number. This makes it possible to simplify a demodulation operation which has been previously essential, and achieve enhanced high-frequency characteristics while reducing a processing load associated with a bearing control. Further, during the A/D conversion synchronous with the carrier component, the moderated signal may be sampled synchronously with a timing when the carrier component of the moderated signal becomes maximum or minimum, or may be sampled in a phase range which is 1/4 of a carrier period centered at a phase where the carrier component becomes maximum or minimum. This makes it possible to suppress deterioration in S/N ratio.

DETAILED DESCRIPTION OF THE EXEMPLARY EMBODIMENTS

Figure 1:
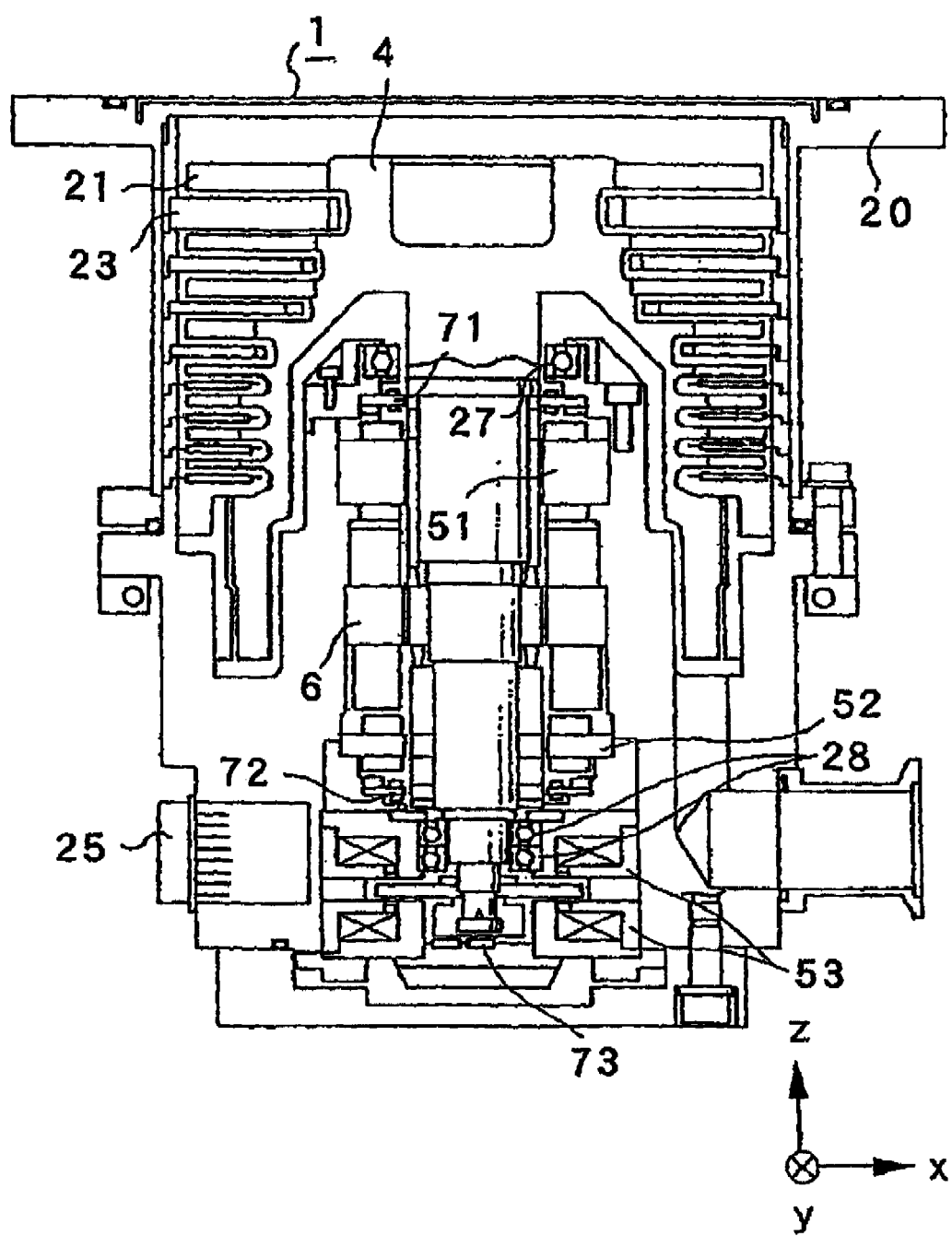
FIG. 1 is a sectional view showing a schematic structure of a pump body 1 of magnetic bearing-type turbo-molecular pump equipped with a 5-axis control-type magnetic bearing system according one embodiment of the present invention.

With reference to the drawings, an exemplary embodiment of the present invention will now be described. FIG. 1 is a sectional view showing a schematic structure of a pump body 1 of magnetic bearing-type turbo-molecular pump. The following description will be made based on an example where the present invention is applied to a 5-axis control-type magnetic bearing system provided in the turbo-molecular pump. As shown in FIG. 1, the 5-axis control-type magnetic bearing system of the turbo-molecular pump is designed such that a rotor 4 formed with plural stages of rotor blades 21 is supported by two electromagnets 51, 52 constituting a radial magnetic bearing, and an electromagnet 53 constituting an axial magnetic bearing, in a non-contact manner.

The turbo-molecular pump has a plurality of stator blades 23 which are fixed to an inner wall of a casing 20 in a multistage manner along an axial direction (vertical direction in FIG. 1) in such a manner as to be arranged alternately with the rotor blades 21. The magnetic bearing system includes two radial sensors 71, 72 corresponding to the respective radial electromagnets 51, 52, and an axial sensor 73 corresponding to the axial electromagnet 53, to detect a levitated position of the rotor 4. A controller (not shown) is connected to the pump body 1 through a cable (not shown) and a receptacle 25. After the rotor 4 is supported by the electromagnets 51, 52, 53, the motor 6 can be rotationally driven to perform a pumping action.

The reference numerals 27, 28 indicate emergency mechanical bearings adapted to support the rotor 4 when the rotor 4 cannot be magnetically levitated. Specifically, in the emergency situation, the bearing 27 restricts two-radial (X-axial and Y-axial) movements of the rotor 4, and the bearing 28 restricts two-radial (X-axial and Y-axial) movements and one-axial (Z-axial) movement of the rotor 4.

Figure 2:
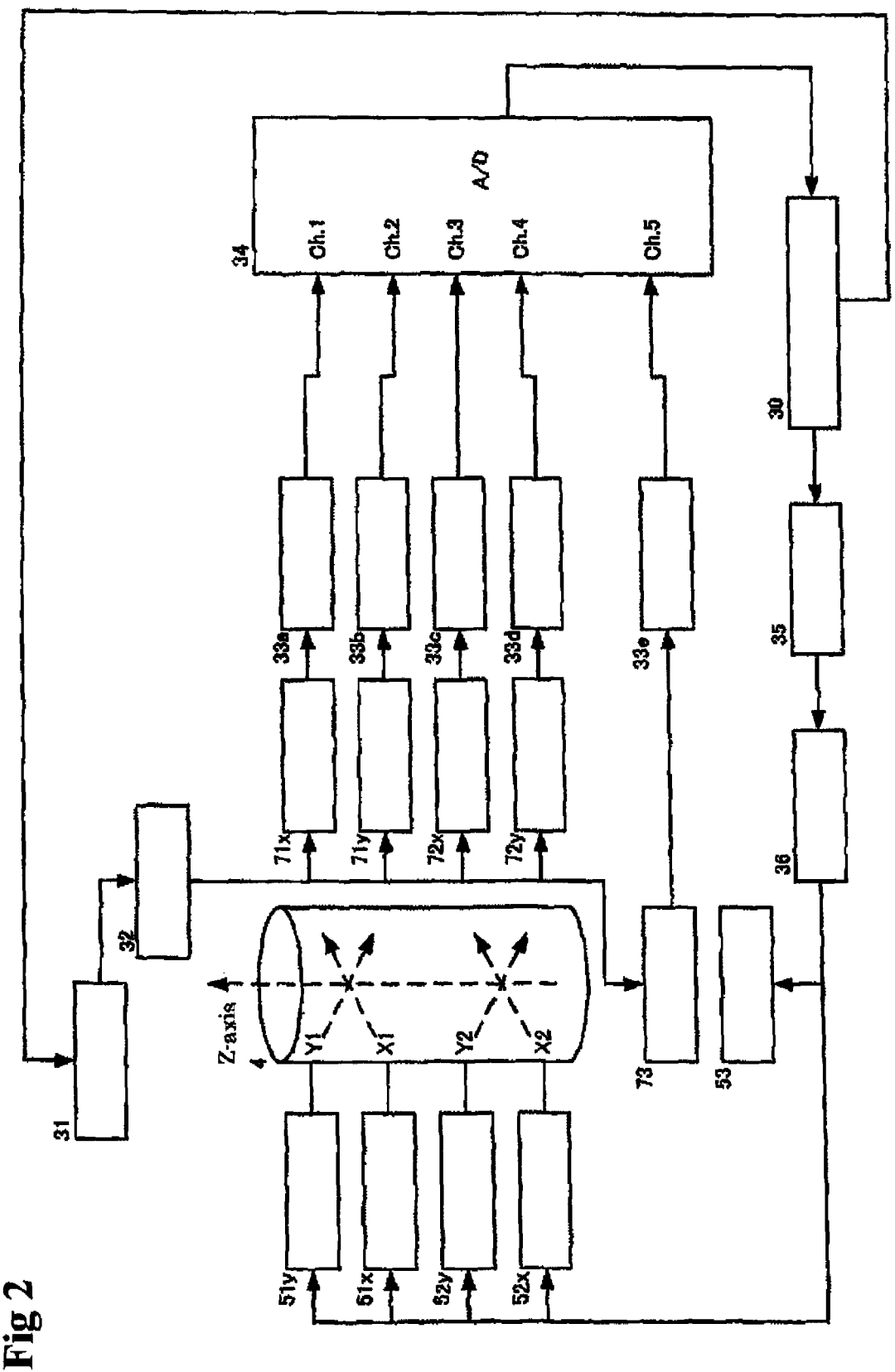
FIG. 2 is a block diagram showing a control scheme of the 5-axis control-type magnetic bearing system.

FIG. 2 is a block diagram showing a control scheme of the 5-axis control-type magnetic bearing system. The radial electromagnet 51 includes an X1-axis electromagnet $51x$ and a Y1-axis electromagnet $51y$, and the radial electromagnet 52 includes an X2-axis electromagnet $52x$ and a Y2-axis electromagnet $52y$. Each of the electromagnets $51x$, $51y$, $52x$, $52y$ is composed of a single electromagnet formed to be disposed across the rotor 4. The sensor 71 includes an X1-axis sensor $71x$ and a Y1-axis sensor $71y$ which correspond to the X1-axis electromagnet $51x$ and the Y1-axis electromagnet $51y$, respectively. In the same manner, the sensor 72 includes an X2-axis sensor $72x$ and a Y2-axis sensor $72y$ which correspond to the X2-axis electromagnet $52x$ and the Y2-axis electromagnet $52y$, respectively.

Each of the sensors $71x$, $71y$, $72x$, $72y$, 73 is composed of an inductance type which is operable to convert a change in a gap relative to the rotor 4 (i.e., a displacement of the rotor 4) to an electric signal, based on an impedance change in the sensor resulting from the change in the gap. A digital control circuit 30 is operable to generate a carrier signal having a frequency fc, and a D/A converter 31 is operable to convert the carrier signal from the digital control circuit 30, to an analog signal, and apply the analog signal to each of the sensors $71x$, $71y$, $72x$, $72y$, 73 through a filter 32.

Each of the sensors $71x$, $71y$, $72x$, $72y$, 73 is operable to amplitude-modulate the carrier signal applied thereto, depending on an impedance change in the sensor resulting from a change in the gap, and input the amplitude-modulated signal (hereinafter referred to simply as "modulated signal) into an A/D converter 34 through a corresponding one of five sensor circuits $33a$, $33b$, $33c$, $33d$, $33e$. The A/D converter 34 is operable to sequentially convert the analog signals from the sensor circuits $33a$ to $33e$, to a digital sequence, and input the digital sequence into the digital control circuit 30.

Then, the digital control circuit 30 is operable to calculate an excitation current to be applied to each of the electromagnets $51x$, $51y$, $52x$, $52y$, 53, based on a magnetic levitation control constant pre-stored therein, and the positional information converted to the digital sequence. A D/A converter 35 is operable to convert each of the excitation-current control signals to an analog signal, and input the analog signal into an excitation amplifier 36. Although only one excitation amplifier 36 is illustrated in FIG. 2, the excitation amplifier 36 is actually provided in a number (in this embodiment, five)

equal to that of the control axes, so that each of the excitation-current control signals are supplied from a corresponding one of the excitation amplifiers 36 to a corresponding one of the electromagnets 51x, 51y, 52x, 52y, 53.

Figure 3:
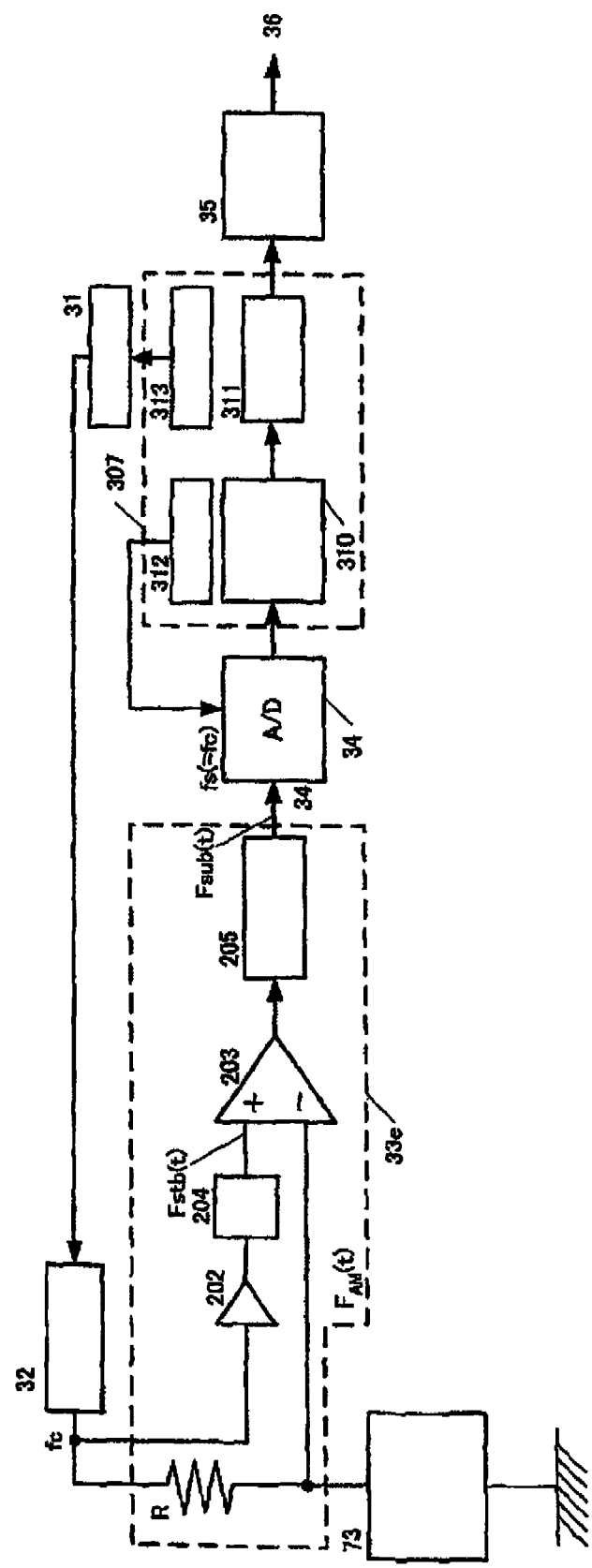
FIG. 3 is a block diagram specifically showing a section associated with a axial (Z-axis) sensor 73 of the control scheme in FIG. 2.

FIG. 3 is a block diagram specifically showing a section associated with the Axial (Z-axis) sensor 73 of the control scheme in FIG. 2. A sinusoidal-discrete-sequence generation section 313 of the digital control circuit 307 is operable to generate a sinusoidal discrete sequence, and the D/A converter 31 is operable to convert the sinusoidal discrete sequence to an analog signal and output the analog signal to the filter 32. This analog signal output from the D/A converter 31 includes a higher harmonic and thereby has a stepped waveform. Thus, the filter 32 may be composed of a lowpass filter or a bandpass filter to filter the analog signal so as to obtain a smooth carrier signal. The carrier signal is applied to the sensor 73 through a resistor R connected in series between the filter 32 and the sensor 73. The carrier signal Fcarrier (t) output from the filter 32 is expressed by the following Formula (1):

$$F\text{carrier}(t) = A \sin(2\pi f c\, t) \quad (1)$$

wherein fc is a carrier frequency.

The carrier signal applied to the displacement sensor 73 is amplitude-modulated depending on an impedance change resulting from a change in position (i.e., displacement) of the rotor 4, and formed as an amplitude-modulated signal $F_{AM}(t)$ which is expressed by the following Formula (2)

$$F_{AM}(t) = (A + F\text{sig}(t))\sin(2\pi f c\, t + \phi) \quad (2)$$

wherein Fsig (t) is a position information signal, and φ is a phase difference between the modulated signal and the carrier signal.

Figure 4:
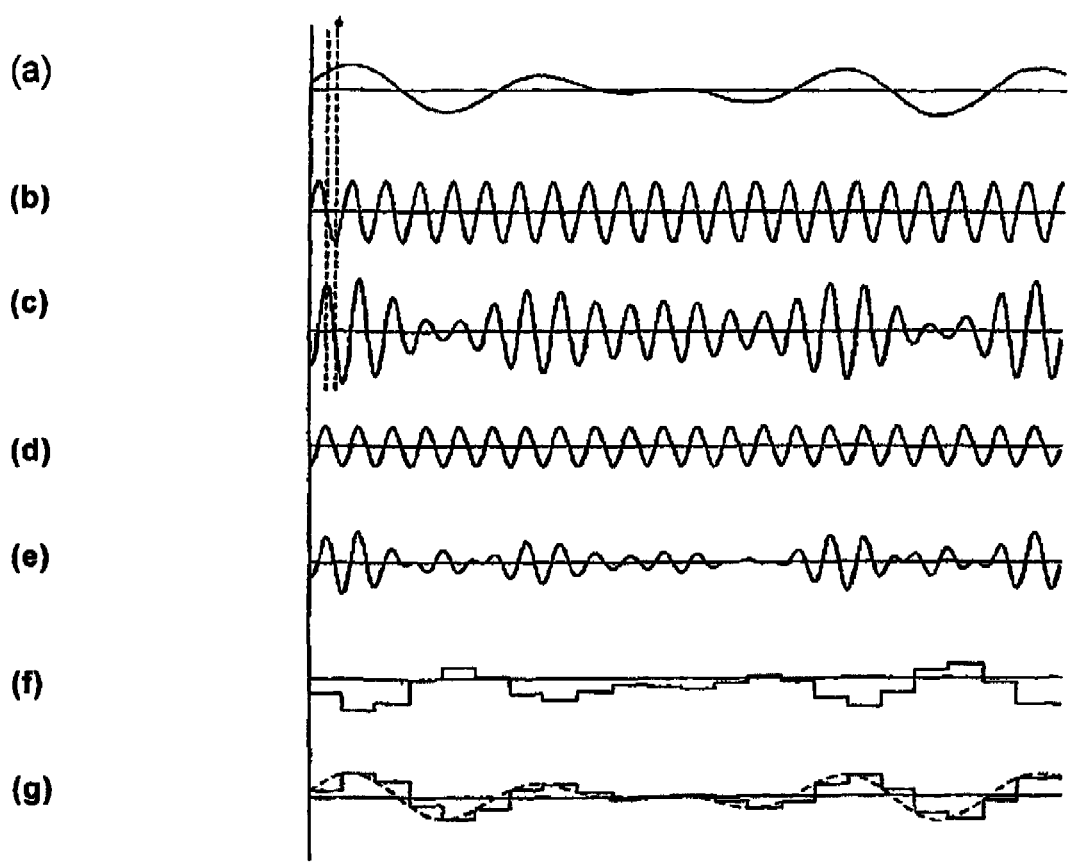
FIG. 4 shows an example of respective waveforms of related signals.

FIG. 4 shows an example of respective waveforms of related signals, wherein waveform (a) is an example of a waveform of the position information signal Fsig (t), and waveform (b) is an example of a waveform of the carrier signal Fcarrier (t). When the carrier signal Fcarrier (t) of waveform (b) is modulated with the position information signal Fsig (t) of waveform (a), the amplitude-modulated signal $F_{AM}(t)$ has a waveform (c). This amplitude-modulated signal $F_{AM}(t)$ is input from the displacement sensor 73 into a difference amplifier 203.

The difference amplifier 203 is operable, in response to receiving the amplitude-modulated signal $F_{AM}(t)$, and a sensor reference signal Fstd (t) expressed by the following Formula (3), to output a difference signal Fsub (t) representing a difference between the two signals. The sensor reference signal Fstd (t) is formed by adjusting a gain of the carrier signal Fcarrier (t) through a gain adjustment section 202 and then adjusting a phase of the carrier signal Fcarrier (t) in such a manner as to conform to a phase of the amplitude-modulated signal $F_{AM}(t)$ through a phase shift circuit 204.

The sensor reference signal Fstd (t) has a waveform (d), and the difference signal Fsub (t) has a waveform (e). Then, the difference signal Fsub (t) output from the difference amplifier 203 is subjected to a filter 205 having a passband centered at the carrier frequency.

$$F\text{std}(t) = C\sin(2\pi f c t + \phi) \quad (3)$$

$$\begin{aligned}F\text{sub}(t) &= F_{AM}(t) - F\text{std}(t) \\ &= (A + F\text{sig}(t) - C)\sin(2\pi f c t + \phi)\end{aligned} \quad (4)$$

Then, the A/D converter 34 is operable to convert the difference signal Fsub (t) input thereinto from the filter 205 to a digital sequence. This digital sequence is obtained through a digital sampling operation. For example, a digital sequence obtained by digital-sampling a sinusoidal wave having a frequency fa, at a sampling frequency fb, is represented as a discretized signal having a frequency (fa−fb).

The digital sampling operation in the A/D converter 34 is performed based on the sinusoidal discrete sequence generated by the sinusoidal-discrete-sequence generation section 313. During this operation, in consideration of a certain phase shift occurring in the carrier signal when modulated by the displacement sensor, a phase-shift operation section 312 is operable to shift a phase of the sinusoidal discrete sequence, and input the phase-shifted sinusoidal discrete sequence into the A/D converter 34. Then, the A/D converter 34 is operable to conform a timing for converting the modulated signal to a digital signal, approximately to an envelope of the modulated signal. That is, the conversion timing is synchronized with a maximum level (i.e., positive peak) of a carrier component of the modulated signal.

The following description will be made about one example where a sampling frequency fs in the A/D converter 34 is set at a value equal to the carrier frequency fc of the carrier signal. In this case, a discretized signal e(t) to be obtained by sampling the difference signal Fsub (t) at the carrier frequency fc is expressed by the following Formula (5), wherein: P=A−C; Q=sin φ; and each of P and Q is a constant.

$$\begin{aligned}e(t) &= (A + F\text{sig}(t) - C)\sin\{(2\pi(fc - fc)t + \phi\} \\ &= (A + F\text{sig}(t) - C)\sin\phi \\ &= QP + QF\text{sig}(t)\end{aligned} \quad (5)$$

As seen in Formula (5), the discretized sensor signal e(t) includes no carrier wave, and has a distinctive advantage of being able to simplify a demodulation operation. Waveform (f) in FIG. 4 is the discretized sensor signal e(t). A gain/offset adjustment section 310 is operable to adjust an offset and gain of the discretized sensor signal e(t) so as to allow the original position information signal Fsig (t) to be extracted. Waveform (g) in FIG. 4 is the discretized sensor signal e(t) after the gain/offset adjustment, wherein the position information signal Fsig (t) indicated by the dotted line is superimposed on the discretized sensor signal e(t). A control operation section 311 is operable to calculate a control amount of the excitation current based on the extracted position information signal Fsig (t).

While the above example has been described on the assumption of fc=fs, the relation between the sampling frequency fs and the carrier frequency fc may also be set to be fc=n·fs, to obtain a discretized sensor signal which includes no carrier wave and has an advantage of being able to simplify the need for performing a demodulation operation and a filtering operation. On the assumption that a value at t=mTs (wherein m=0, 1, 2, - - - -, and Ts=1/fs) is sampled, the discrete sequence signal to be obtained by sampling the difference signal Fsub (t) at the sampling frequency fs is expressed by the following formula:

(A+Fsig(mTs)−C)sin(2πfc·mTs+φ)

For example, in case of fc=n·fs, the same result as in the case of fc=fs will be obtained as shown in the following formula:

$$(A + Fsig(mTs) - C) \\ \sin(2\pi fc \cdot mTs + \phi) = (A + Fsig(mTs) - C)\sin(2\pi n \cdot fs \cdot m/fs + \phi)$$

$$= (A + Fsig(mTs) - C)\sin(2\pi n \cdot m + \phi)$$

$$= (A + Fsig(mTs) - C)\sin\phi$$

$$= QP + QFsig(mTs)$$

Figure 5:
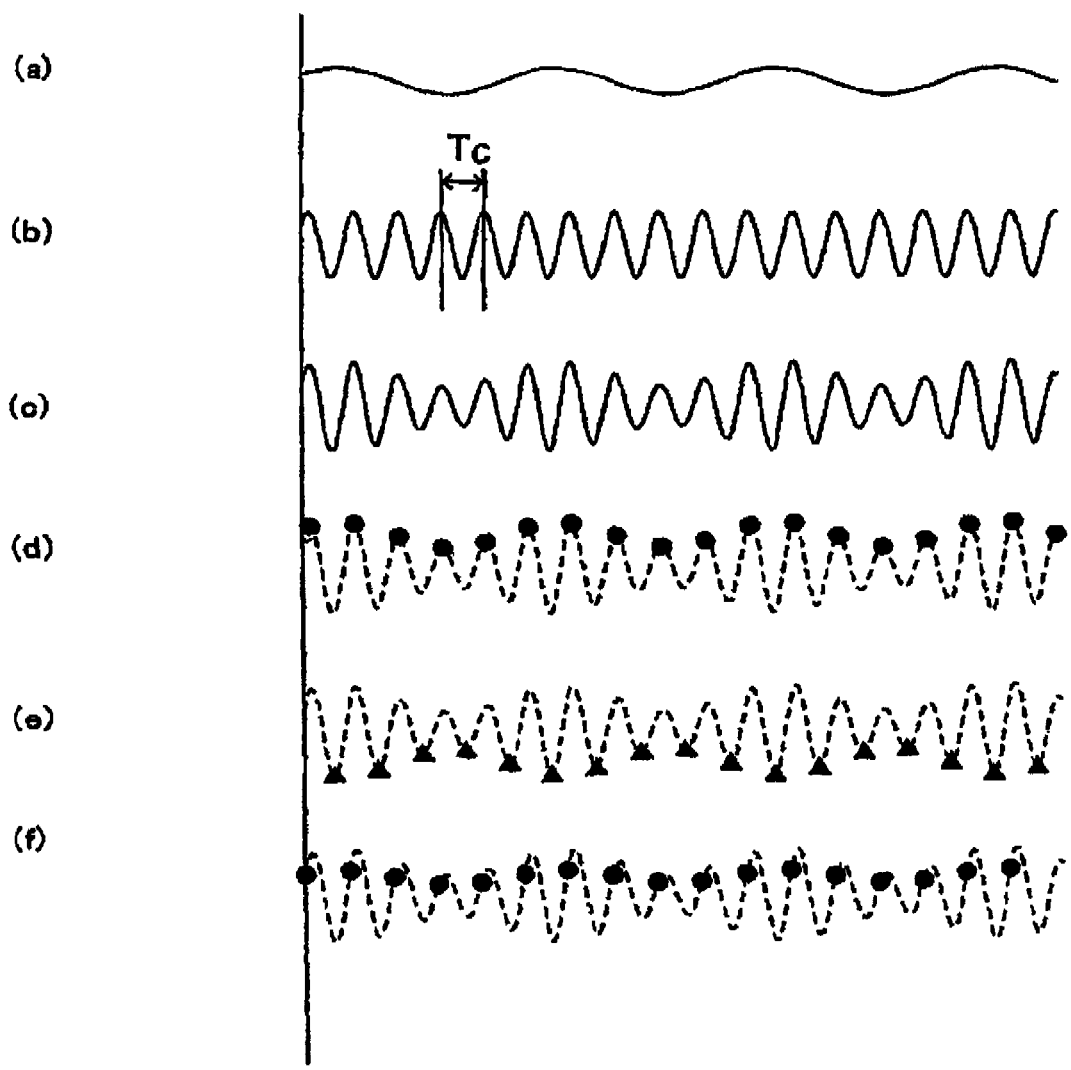
FIG. 5 shows waveform charts for explaining a sampling timing.

FIG. 5 shows waveform charts for explaining a sampling timing in the operation of sampling a modulated signal in synchronization with a carrier signal (i.e., a carrier component of the modulated signal). Waveform (a) is a displacement signal corresponding to the aforementioned position information signal. Waveform (b) is the carrier signal, and waveform (c) is a sensor signal (i.e., modulated signal) formed by modulating the carrier signal with the position information signal. The sensor signal includes a carrier component which is changed at the carrier frequency. Waveforms (d)-(f) are two types of discrete sequence signals sampled under the condition of fc=fs (i.e., in case of n=1), wherein each of the discrete sequence signals has a different sampling initiation timing. In case of n=1, the sensor signal is sampled every one period Tc of the carrier component. The discrete sequence signal illustrated as waveform (d) is sampled synchronously with a timing when the carrier component becomes maximum (i.e., has a positive peak). In the discrete sequence signal illustrated as waveform (e), the sampling timing is synchronized with a timing when the carrier component becomes minimum (i.e., has a negative peak). In the discrete sequence signal obtained at the sampling timing as waveform (e), positive and negative sides thereof can be simply inverted to obtain the displacement signal waveform (a). The discrete sequence signal illustrated as waveform (f) is sampled synchronously with a timing out of the positive and negative peaks.

In case of n=-2, the sensor signal is sampled every two periods of the carrier component. That is, one of the circular or triangular marks in FIG. 5 is sampled after skipping one. In n=3, one of the circular or triangular marks is sampled after skipping two. In case of n=4, one of the circular or triangular marks is sampled after skipping three. In case of n=5 or more, the sensor signal will be sampled according to the same rule.

When the sampling frequency fs is set to satisfy the following relation: fc=fs/2, a resulting discretized sequence signal is expressed by the following formula:

$$(A + Fsig(mTs) - C)\sin(2\pi fc \cdot mTs + \phi) = (A + Fsig(mTs) - C)\sin(\pi \cdot m + \phi)$$

In this case, the sensor signal is sampled every ½ periods of the carrier component. If a sampling operation is initiated synchronously with a timing of one positive peak of the carrier component, a first sampling is performed at a timing of one circular mark in waveform (d), and a second sampling is performed at a timing of one triangular mark in waveform (e). That is, the sampling operation will be performed at timings of a positive peak, a negative peak, a positive peak, a negative peak, - - - , in this order. In this case, the negative sign of the negative peaks of the discretized sequence signal can be inversed to obtain an envelope of the sensor signal in waveform (c), i.e., the displacement signal of waveform (a).

Figure 6:
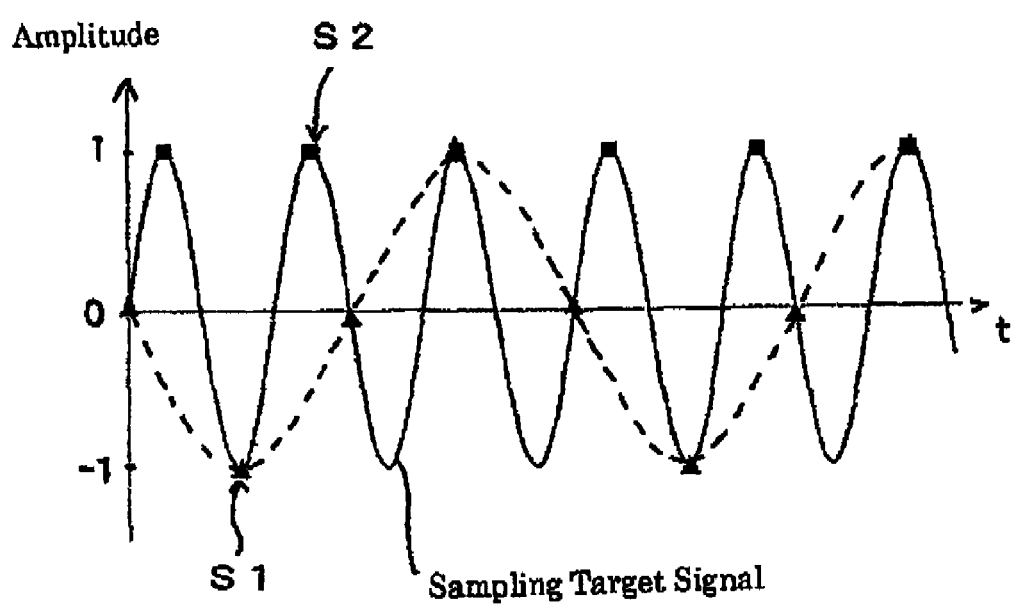
FIG. 6 is a waveform chart for explaining an improvement in S/N ratio.

A comparative example, a sampling operation based on a sampling frequency fs set at a value ⁴⁄₃ times greater than the carrier frequency fc will be discussed below. This discussion will be made on the assumption that a target signal to be sampled is a simple sinusoidal wave indicated by the solid line in FIG. 6. When the sinusoidal signal in FIG. 6 is A/D converted at fs=(⁴⁄₃) fc, the sampling operation is performed at timings of triangle marks S1 in FIG. 6. A resulting discretized sequence signal has a periodicity as indicated by short dashes line, and a frequency which is ¼ of that of the target signal.

In the comparative example, after the A/D conversion, it is necessary to perform a demodulation operation of multiplying the A/D-converted data by the sinusoidal signal having a frequency which is ¼ of that of the target signal. The target signal Fsample (t) is expressed by the following Formula (6), and the A/D-converted data signal FADin is expressed by the following Formula (7):

$$Fsample(t) = K\sin(2\pi fct + \xi) \quad (6)$$

$$FADin = K\sin\{2\pi(fs/4) \cdot nTs + \xi'\} \quad (7)$$
$$= K\sin(\pi \cdot n/2 + \xi')$$

wherein Ts is a sampling period.

Given that the sinusoidal signal Fdecode for multiplication in the demodulation operation is expressed by the following Formula (8), a demodulated signal Fdetect is expressed by the following Formula (9):

$$Fdecode = L\sin\{2\pi(fs/4) \cdot nTs + \xi'\} \quad (8)$$
$$= L\sin\{(\pi/2) \cdot n + \xi'\}$$

$$Fdetect = FADin \times Fdecode \quad (9)$$
$$= KL\sin2\{(\pi/2) \cdot n + \xi'\}$$
$$= KL\{1 - \cos(\pi n + \xi')\}/2$$

Given that L=K=1, and ξ'=0, it is proven that a target signal Fsample (t)=sin(2π fc t) having an amplitude of 1 is decayed as Fdetect=½. In this case, after the demodulation operation, a lowpass filtering operation is necessary to extract a DC component (=KL/2). In the example illustrated in FIG. 6, the target signal is sampled at timings of the triangle marks, and thereby an extracted signal has values of 0, -1, 0, 1, 0, -1, 0, 1, 0, - - - . This extracted signal after being multiplied by a synchronous signal with the same frequency has values of 0, 1, 0, 1, 0, 1, 0, 1, - - - , and an average of these values is 0.5 which means that the target signal is decayed to half.

In contrast, when the sampling operation is performed under the condition of fc=fs as in this embodiment, the target signal is sampled at timings of square marks S2 in FIG. 6, and thereby an extracted signal can be directly used as a position information signal, as mentioned above. As is clear from waveforms (d) and (e) in FIG. 5, this advantage can also be obtained under the conditions that the relation between the sampling frequency fs and the carrier frequency fc is set to be fc=n fs (n is natural number) or fc=fs/2, and the sampling operation can be performed synchronously with a timing of a positive or negative peak of the carrier component, to prevent deterioration in S/N ratio.

As shown with respect to waveform (f) in FIG. 5, when a sampling initiation timing deviates from respective timing of positive and negative peaks of the carrier component, a signal gain is lowered. If it is attempt to increase the gain up to a value to be obtained in the demodulation operation synchronous with the timing of the positive peak, an S/N ratio will deteriorate. The deterioration in S/N ratio becomes more prominent as a phase difference between the sampling timing and the timing of the positive peak becomes larger, and no signal component will be detected when the sampling timing deviates from the timing of the positive peak by 90 degrees in phase.

In the control scheme of the 5-axis control-type magnetic bearing system illustrated in FIG. 2, if carriers each having a common frequency and a common phase are applied, respectively, to the five sensors, respective carrier components of sensor signals from two or more of the sensors having the same configuration will have of the same phase.

Figure 7:
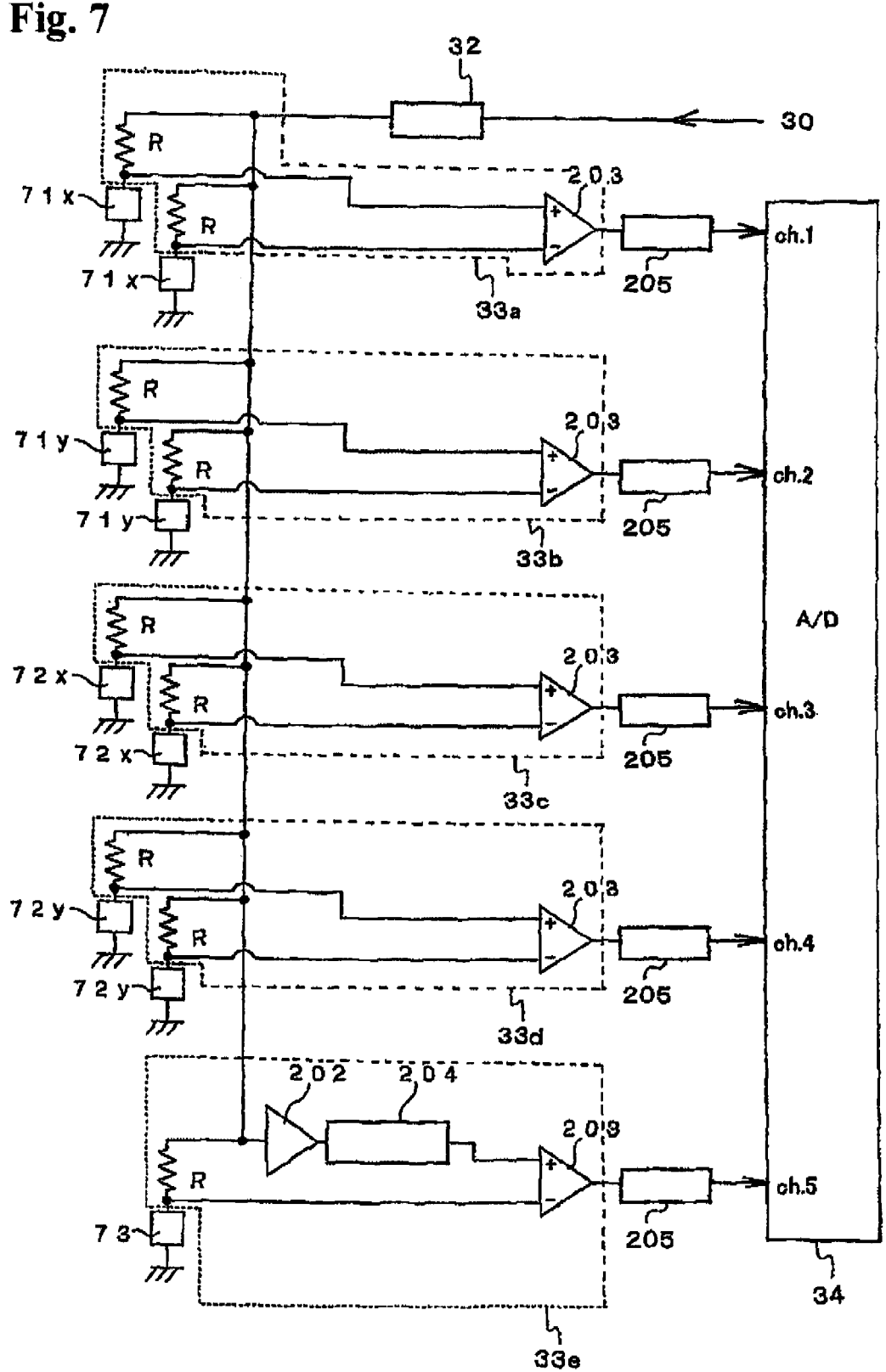
FIG. 7 is a circuit diagram specifically showing sensors $71x$ to 73 for each axis and sensor circuits $33a$ to $33e$ in FIG. 2.

FIG. 7 is a circuit diagram specifically showing the five sensors 71x to 73 and the sensor circuits 33a to 33e in FIG. 2. Each of the X1-axis sensor 71x, the Y1-axis sensor 71y, the X2-axis sensor 72x and the Y2-axis sensor 72y as the radial sensors is designed to have the same configuration, and the control scheme is configured to calculate a difference between respective output signals from each pair of the sensors.

As to the axial sensor 73, a difference between an output signal from the axial sensor, and the sensor reference signal Fstd (t), is calculated, as mentioned above. Due to the difference in sensing process between the radial sensor group and the axial sensor, a phase difference between a Z-axis signal and each of X1-axis, Y1-axis, X2-axis and Y2-axis signals is apt to become larger. Thus, the A/D converter 34 can sample the Z-axis signal in synchronization with a timing of a positive peak of a carrier component of the Z-axis signal, while sampling an additional one of the remaining signals in synchronization with a timing of a positive peak of a carrier component of the additional signal.

However, the four radial sensors have the same configuration as shown in FIG. 7, and thereby each of the X1-axis, Y1-axis, X2-axis and Y2-axis signals will be input into the A/D converter 34 in the same phase. This makes it impossible to sample all of the X1-axis, Y1-axis, X2-axis and Y2-axis signals in synchronization with a timing of a positive peak of a carrier component of these signals. For example, if the X1-axis signal and the Y1-axis signal are sampled in synchronization, respectively, with timings of a positive peak and a negative peak of the carrier component, the remaining X2-axis and Y2-axis signals will be sampled in synchronization, respectively, with timings out of the positive peak and the negative peak, to cause deterioration in S/N ratio.

The following description will be made about a strategy for solving the above problem.

First Strategy

Figure 8:
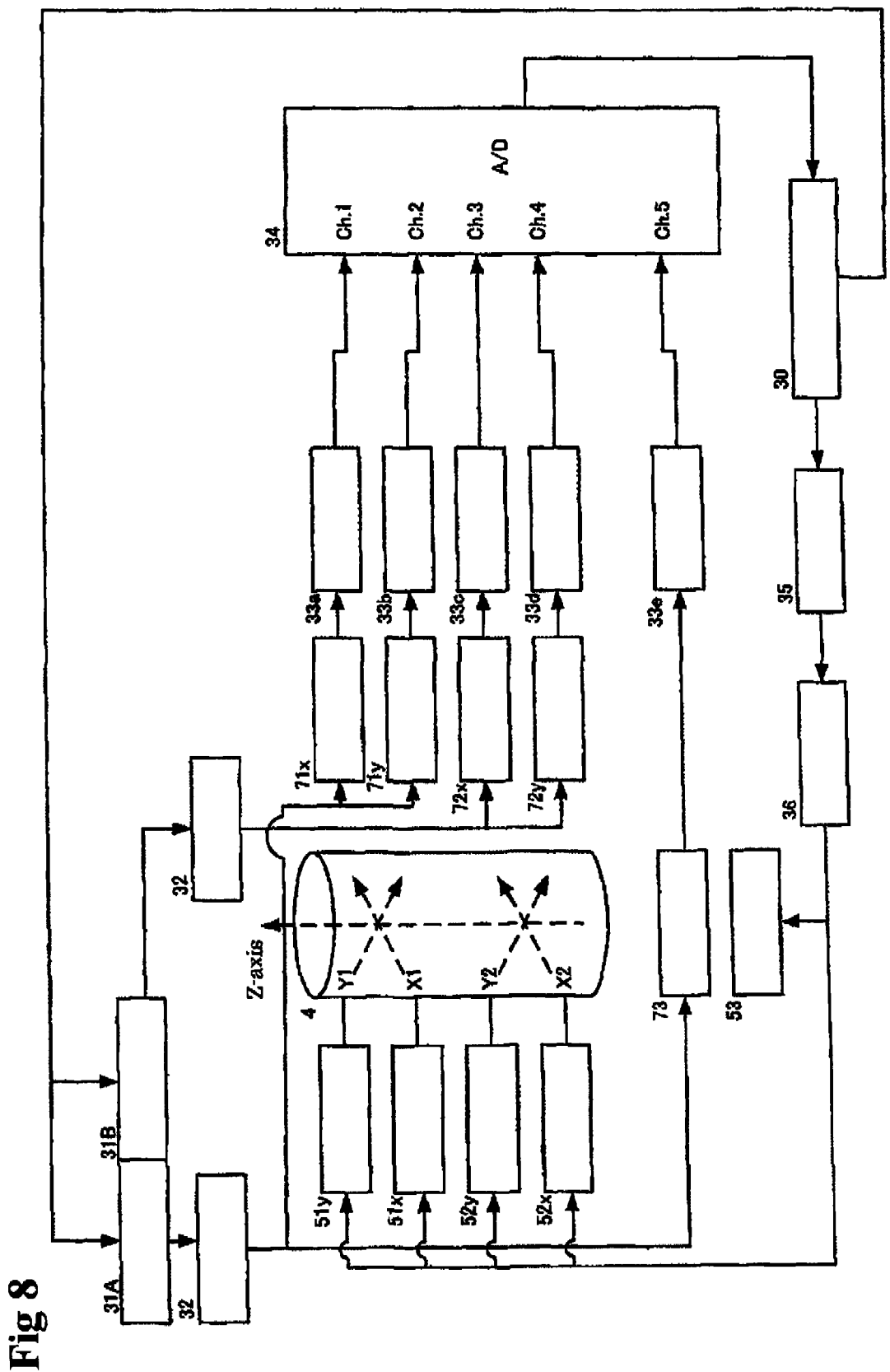
FIG. 8 is a block diagram for explaining a first strategy.

A first strategy is intended to generate plural types of carrier signals each having a different phase and apply the carrier signals to the sensors, respectively. FIG. 8 is a block diagram showing one example of a control scheme based on the first strategy. This control scheme includes two D/A converters 31A, 31B designed to generate two types of carrier signals each having a different phase.

A sinusoidal discrete sequence generated by the sinusoidal-discrete-sequence generation section 313 of the digital control circuit 30 (see FIG. 3) is input into each of the D/A converters 31A, 31B. The D/A converter 31A is operable to generate a first carrier signal and input the first carrier signal into each of the Z-axis (axial) sensor 73, the X1-axis sensor 71x and Y1-axis sensor 71y, through the filter 32. The D/A converter 31B is operable to generate a second carrier signal and input the second carrier signal into each of the X2-axis sensor 72x and the Y2-axis sensor 72y, through the filter 32.

In this control scheme, respective carrier components of X1-axis and Y1-axis sensor signals to be input into the A/D converter 34 have the same phase, and respective carrier components of X2-axis and Y2-axis sensor signals to be input into the A/D converter 34 have the same phase. However, the phase of the X1-axis and Y1-axis sensor signals, and the phase of the X2-axis, Y2-axis and Z-axis sensor signals, are different from each other. The A/D converter 34 is operable to sequentially sample these sensor signals through five channels 1 to 5 in order of the channel numbers, for example, in such a manner as to sample the X1-axis and X2-axis sensor signals in synchronization, respectively, with timings of positive peaks of carrier components thereof, and sample Y1-axis and Y2-axis sensor signals in synchronization, respectively, with timings of negative peaks of carrier components thereof. The phase of the Z-axis sensor signal is different from the phase of the X1-axis and Y1-axis sensor signals, and therefore the Z-axis sensor signal can be sampled in synchronization with a timing of a positive peak of a carrier component thereof, independently of the remaining sensor signals.

While the control scheme illustrated FIG. 8 is designed to input two types of carrier signals from the D/A converters 31A, 31B, respectively, into the group of the Z-axis, X1-axis and Y1-axis sensors and the group of the X2-axis and Y2-axis sensors, a correspondence between each of the D/A converters 31A, 31B and each of the sensors 71x, 71y, 72x, 72y, 73 is not limited to the specific correspondence in FIG. 8.

Figure 9:
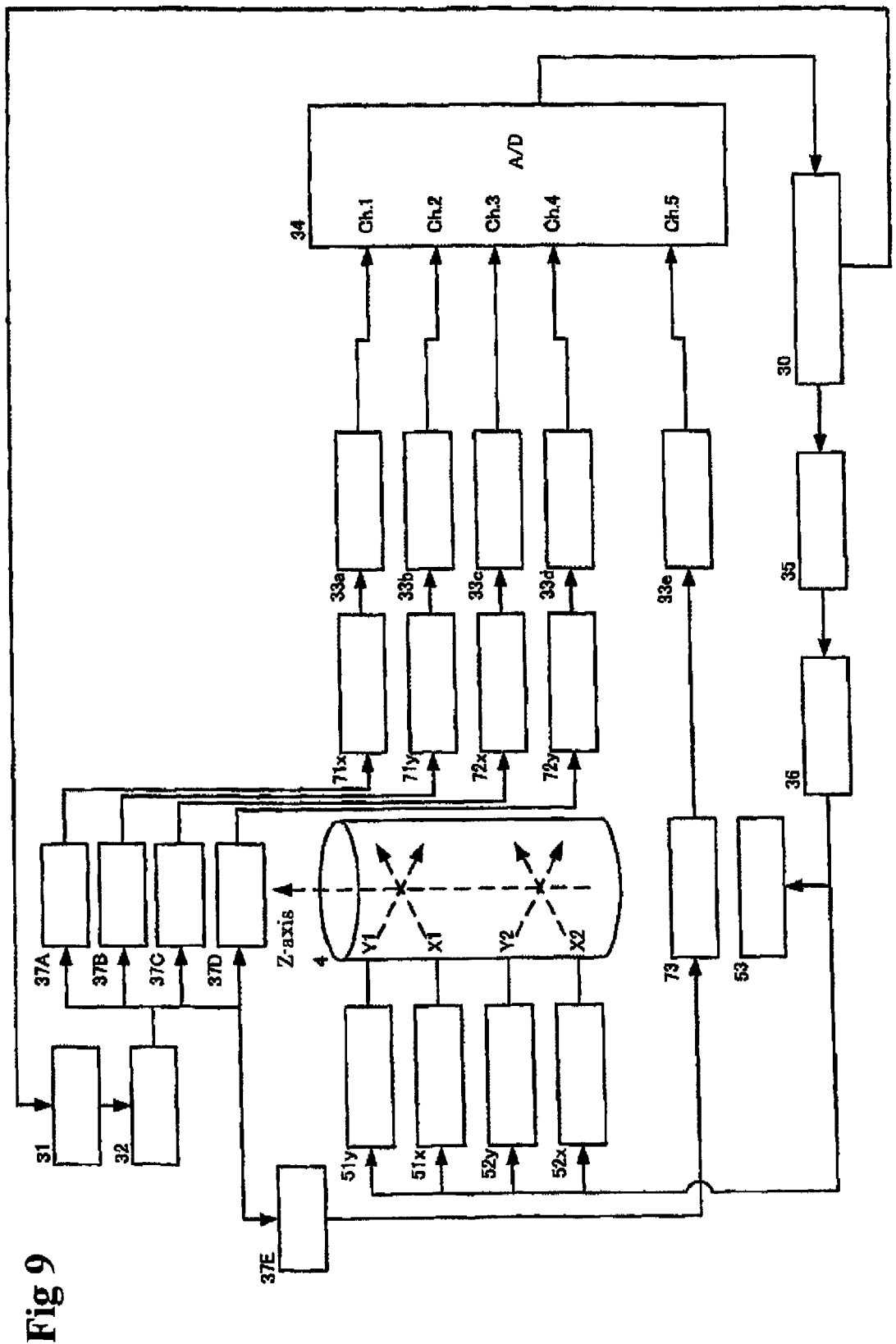
FIG. 9 is a block diagram showing a configuration using a phase shift circuit for phase-shifting a carrier signal.

Further, the control scheme illustrated FIG. 8 employs the plurality of D/A converters to generate plural types of carrier signals each having a different phase. Alternatively, as shown in FIG. 9, a phase shift circuit may be employed to create a phase difference between the carrier signals. In a control scheme illustrated in FIG. 9, a carrier signal output from the filter 32 is input into each of five phase shift circuits 37A to 37E. Then, the carrier signal phase-shifted by the phase shift circuit 37A is input into the X1-axis sensor 71x. In the same manner, the carrier signals phase-shifted by the phase shift circuits 37B to 37E are input into the sensors 71y, 72x, 72y, 73, respectively.

An amount of phase shifting in each of the phase shift circuits 37A to 37E is set to allow a sensor signal input into each of the channels 1 to 5 of the A/D converter 34 to be sampled in synchronization with a timing of a positive or negative peak of a carrier component of the sensor signal. Thus, for example, the sensor signals input into the channels 1, 3, 5 can be sampled in synchronization with a timing of a positive peak of the carrier component, and the sensor signals input into the channels 2, 4 can be sampled in synchronization with a timing of a negative peak of the carrier component.

While the control scheme illustrated in FIG. 9 employs the phase shift circuits provided in a number equal to that of the five sensors, it is not essential to provide the phase shift circuits in one-to-one correspondence to the five sensors. For example, the carrier signal output from the filter 32 may be directly input into each of the X1-axis and Y1-axis sensors, and the carrier signal phase-shifted through a phase shift circuit by 90 degrees is input into each of the X2-axis and Y2-axis sensors. Each of X1-axis, Y1-axis X2-axis and Y2-axis sensor signals can be sampled in synchronization with a timing of a positive or negative peak of a carrier component thereof.

Second Strategy

Figure 10:
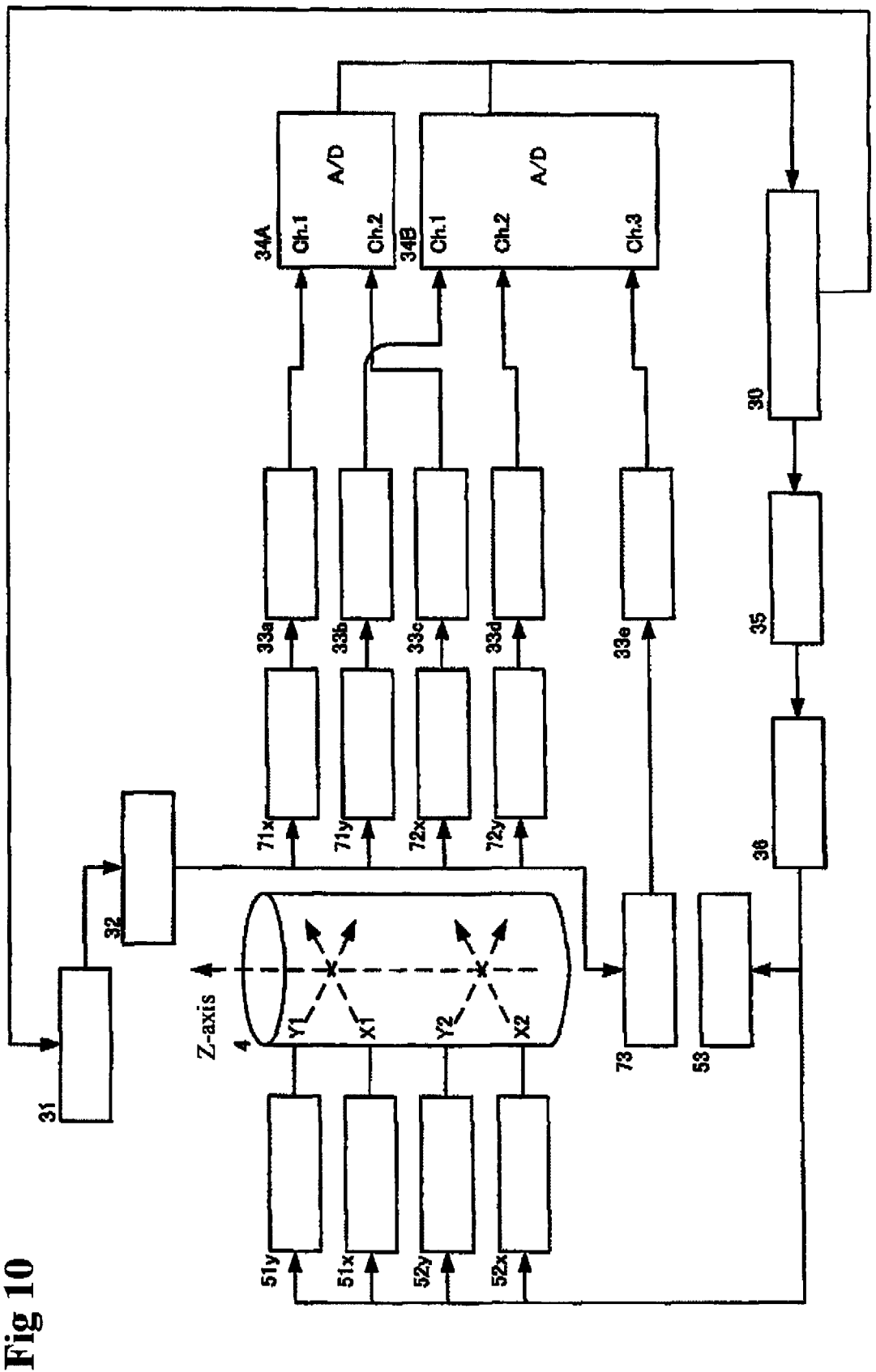
FIG. 10 is a block diagram for explaining a second strategy.

A second strategy is intended to employ a plurality of A/D converters designed to sample each of the five sensor signals in synchronization with a timing of a positive or negative peak of a carrier component thereof FIG. 10 is a block diagram showing one example of a control scheme based on the second strategy, wherein the control scheme is provided with two A/D converters 34A, 34B. Sensor signals from the X1-axis and X2-axis sensor circuits are input into the A/D converter 34A, and sensor signals from the Y1-axis, Y2-axis and Z-axis sensor circuits are input into the other A/D converter 34B.

In the second strategy, the two sensor signals input into respective channels 1 of the A/D converters 34A, 34B, or the two sensor signals input into respective channels 2 of the A/D converters 34A, 34B, can be sampled at a common timing. For example, respective sensor signals from the X1-axis sensor 71x and the Y1-axis sensor 71y are sampled in synchronization with a timing of a positive peak of a carrier component thereof, and respective sensor signals from the X2-axis sensor 72x and the Y2-axis sensor 72y are sampled in synchronization with a timing of a negative peak of the carrier component. A sensor signal from the Z-axis sensor 73 has a phase out of that of the sensor signals from the Y1-axis sensor 71y and the Y2-axis sensor 72y, and therefore a sampling timing for a channel 3 can be set at or around a positive or negative peak of a carrier component of the sensor signal.

Third Strategy

In the first strategy, a plurality of D/A converters, or one or more phase shift circuits, are employed to create a phase difference between respective carrier components of a plurality of sensor signals. In the second strategy, a plurality of A/D converters are employed to allow a plurality of sensor signals each having the same phase to be sampled at a common timing. This makes it possible to sample each of the sensor signals in synchronization with a timing of a positive or negative peak of the carrier component thereof so as to prevent deterioration in S/N ratio. A third strategy is intended to minimize deterioration in S/N ratio even if a sampling timing deviates from a timing of a positive or negative peak of a carrier component of a sensor signal.

Figure 11:
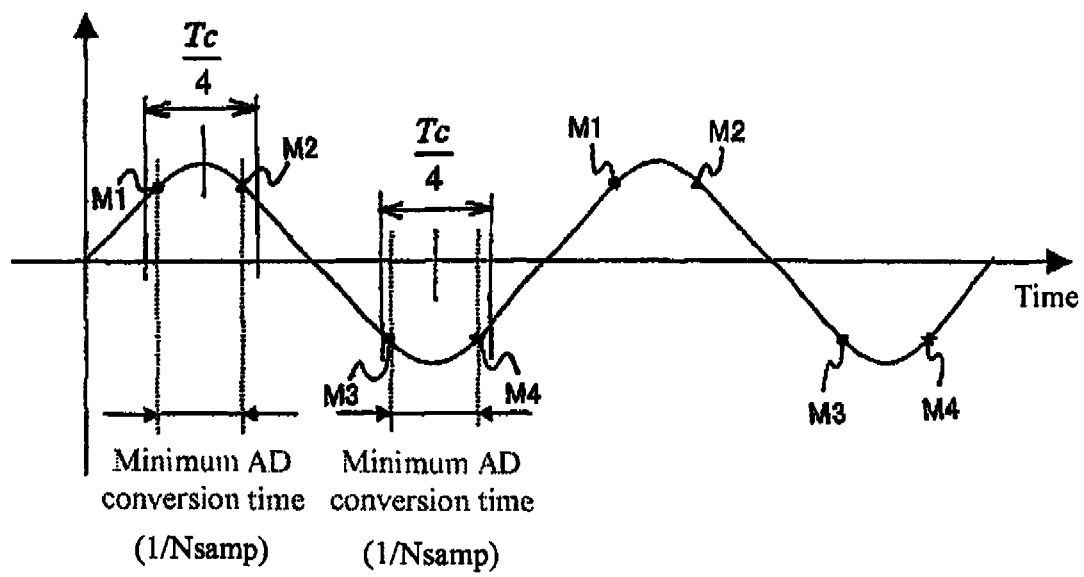
FIG. 11 is a block diagram for explaining a third strategy.

FIG. 11 explains a concept of the third strategy. FIG. 11 shows a sensor signal to be created when the displacement signal of waveform (a) consists only of a DC component. Thus, the sensor signal consists only of a carrier component having the same frequency of a carrier signal, and positive and negative peaks of the carrier component correspond, respectively, to positive and negative peaks of the sensor signal. That is, if a sampling timing deviates from the positive or negative peak of the sensor signal, the deterioration in S/N ratio will become more prominent as an amount of the phase deviation is increased.

In the third strategy, a sampling timing is set within two predetermined time periods centered at positive and negative peaks of the carrier component, to minimize the deterioration in S/N ratio. In the illustrated example, each of the time periods is set to be 1/4 or less of a carrier period Tc (i.e., 90 degrees or less), and the A/D converter 34 is designed to sample the carrier component at two points within each of the time periods.

Given that the number of times of sampling per second in a sampling operation performed at a maximum sampling speed of the A/D converter 34 is Nsamp. In this case, 1/Nsamp seconds are required for a single sampling. In case of a carrier signal having a frequency of fc, fc/Nsamp is a required rate for sampling within one carrier period. In order to perform a sampling operation within the time period of Tc/4 at least, the carrier period Tc is set to satisfy the following relation: Tc=1/fc>4/Nsamp. This makes it possible to perform the sampling twice within 1/4 of the carrier period Tc.

In the example illustrated in FIG. 11, first and second samplings are performed, respectively, at a point M1 (circular mark) and a point M2 (triangular mark) which are located symmetrically with respect to the positive peak, and further third and fourth samplings are performed, respectively, at a point M3 (square mark) and a point M4 (star mark) which are located symmetrically with respect to the negative peak. In this case, the deterioration in signal level is expressed as: sin {90−(fc/Nsamp)·180}. Even if the sampling operation is performed at points each most deviating from the positive or negative peak by ±45 degree, when the sampling is performed twice within the time period of Tc/4, the deterioration in signal level can be suppressed only at sin (45)=0.707=about 3 dB. In the 5-axis control-type magnetic bearing system, a sampling operation for X1-axis, Y1-axis, X2-axis and Y2-axis sensor signals is performed in the above manner illustrated in FIG. 11, and a sampling operation for a Z-axis sensor signal is performed approximately in synchronization with a timing of a positive or negative peak of a carrier component of the sensor signal, by utilizing the characteristic of a Z-axis sensor which has a different configuration from that of other sensors and thereby outputs a signal having a different phase from that of other sensors.

Example of Modification

In the control scheme of the magnetic bearing system, any one of the first to third strategies may be employed, or two or more of them may be employed in combination. For example, as described in connection with the first strategy, a carrier signal phase-shifted through the phase shift circuit by 90 degree phase is input into the X2-axis and Y2-axis sensors. Then, if a Z-axis sensor signal has the same phase as that of X1-axis and Y1-axis sensor signals, the X1-axis and Y1-axis sensor signals are sampled within the time period of Tc/4 centered at a positive peak of a carrier component thereof, as in the third strategy, and the Z-axis sensor signal is sampled in synchronization with a timing of a negative peak of a carrier component thereof. The above operation may also be applied when the Z-axis sensor signal has the same phase as that of X2-axis and Y2-axis sensor signals. Further, if the Z-axis sensor signal has a different phase from those of the X1-axis, Y1-axis, X2-axis and Y2-axis sensors, the Z-axis sensor signal may be sampled approximately at a timing of a positive peak of the carrier component thereof. Thus, all the five sensor signals can be A/D converted at an optimal S/N ratio.

In a correspondence between the above embodiment and elements of the appended claims, the rotor 4 constitutes an object, and the sensors 71 to 73, 71x, 71y, 72x, 72y and the sensor circuits 33a to 33e constitute detection means. The digital control circuit 30 and the excitation amplifier 36 constitutes control means, the sinusoidal-discrete-sequence generation section 313, the D/A converters 31, 31A, 31B and the phase shift circuits 37A to 37E constitute carrier generation means. It is understood that the above description has been presented by way of example, but the above correspondence between the description of the embodiment and elements of the appended claims is not meant to be construed in a limiting sense.

Figure 12:
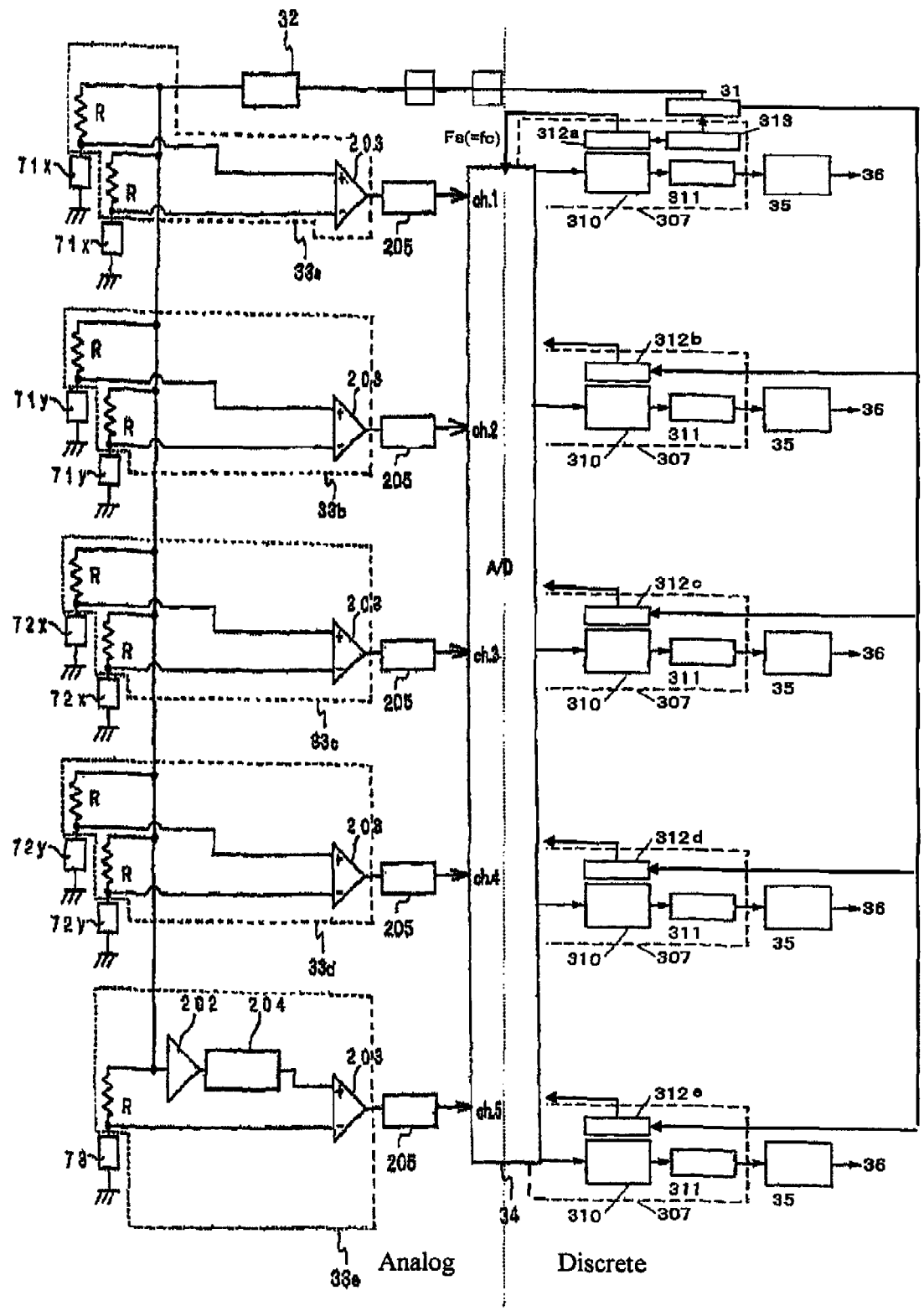
FIG. 12 is a concept of the practical strategy according to the invention.

FIG. 12 shows a specific example according to the invention. Each of phase-shift operation sections 312a-312e in FIG. 12 has the same function as the phase-shift operation sections 312. Specifically, each of the phase-shift operation sections 312a-312e is respectively operable to shift a phase of the sinusoidal discrete sequence, and input the phase-shifted sinusoidal discrete sequence into the A/D converter 34. Then, the A/D converter 34 is operable to conform a timing for converting the modulated signal to a digital signal, based on each of the phase-shift operation sections 312a-312e.

What is claimed is:

1. A magnetic bearing system designed to support an object by an electromagnet in a non-contact manner, comprising:
   carrier generation means for generating a carrier signal;
   detection means for modulating the carrier signal depending on a support position of said object, and outputting a modulated signal;

A/D conversion means for converting the modulated signal output from said detection means, to a digital signal at a sampling frequency which satisfies the following relation: fc=n·fs, or fc=fs/2, wherein: fc is a carrier frequency of said carrier signal; fs is the sampling frequency; and n is a natural number; and control means for controlling an excitation current of said electromagnet based on the digital signal output from said A/D conversion means, to control the support position of said object.

2. The magnetic bearing system as defined in claim 1, wherein said carrier generation means includes:

a sinusoidal-discrete-sequence generation section for generating a sinusoidal discrete sequence through a digital processing;

a D/A conversion section for D/A converting the sinusoidal discrete sequence to generate the carrier signal; and a phase-shift operation section for phase-shifting the sinusoidal discrete sequence through a digital processing, wherein said A/D conversion means is operable, based on the phase-shifted sinusoidal discrete sequence from said phase-shift operation section, to conform a timing for converting the modulated signal to a digital signal, approximately to an envelope of said modulated signal.

3. The magnetic bearing system as defined in claim 1, which is a multi-axis control-type magnetic bearing system having a plurality of control axes, wherein:

said detection means is operable to modulate the carrier signal with respect to each of the plurality of control axes, and output a plurality of modulated signals corresponding to said respective control axes; and said A/D conversion means is operable to (a) A/D convert each of the modulated signals output from said detection means, in synchronization with a carrier component of each of said modulated signals which is changed at said carrier frequency, wherein (b) two of said plurality of modulated signals are sampled approximately synchronously with a timing when the carrier component of said first modulated signal becomes maximum, and remaining ones of said plurality of modulated signals other than said two modulated signals are sampled approximately synchronously with a timing when the carrier component of said second modulated signal becomes minimum.

4. The magnetic bearing system as defined in claim 1, which is a multi-axis control-type magnetic bearing system having a plurality of control axes, wherein:

said detection means is operable to modulate the carrier signal with respect to each of the plurality of control axes, and output a plurality of modulated signals corresponding to said respective control axes; and said A/D conversion means is operable to A/D convert each of the modulated signals output from said detection means, in synchronization with a carrier component of each of said modulated signals which is changed at said carrier frequency, wherein said modulated signal is sampled in a phase range which is ¼ of a carrier period centered at a phase where the carrier component of said modulated signal becomes maximum or minimum.

5. The magnetic bearing system as defined in claim 3, wherein said carrier generation means includes:

a sinusoidal-discrete-sequence generation section for generating a sinusoidal discrete sequence through a digital processing;

a D/A conversion section for D/A converting the sinusoidal discrete sequence to generate the carrier signal; and a phase-shift operation sections for phase-shifting the sinusoidal discrete sequence through a digital processing with respect to each of the plurality of control axes, wherein said A/D conversion means is operable, based on the every phase-shifted sinusoidal discrete sequence from said phase-shift operation sections, to conform a timing for converting the modulated signal to a digital signal.

6. The magnetic bearing system as defined in claim 4, wherein said carrier generation means includes:

a sinusoidal-discrete-sequence generation section for generating a sinusoidal discrete sequence through a digital processing;

a D/A conversion section for D/A converting the sinusoidal discrete sequence to generate the carrier signal; and a phase-shift operation sections for phase-shifting the sinusoidal discrete sequence through a digital processing with respect to each of the plurality of control axes, wherein said A/D conversion means is operable, based on the every phase-shifted sinusoidal discrete sequence from said phase-shift operation sections, to conform a timing for converting the modulated signal to a digital signal.

7. The magnetic bearing system as defined in claim 3 or 4 or 5 or 6, wherein:

said carrier generation means is operable to generate a plurality of carrier signals each having a different phase and a common frequency; and said detection means is operable to select and provide one of said plurality of carrier signals for each controls axis and output a modulated signal.

8. The magnetic bearing system as defined in claim 7, wherein said carrier generation means includes:

a sinusoidal-discrete-sequence generation section for generating a sinusoidal discrete sequence through a digital processing;

D/A conversion means for D/A converting the sinusoidal discrete sequence generated by said sinusoidal-discrete-sequence generation section, to generate the carrier signal; and phase shift means including at least one phase shift circuit for phase-shifting said carrier signal to allow said plurality of carrier signals each having a different phase and a common frequency to be created.

9. The magnetic bearing system as defined in claim 7, wherein said carrier generation means includes:

a sinusoidal-discrete-sequence generation section for generating a sinusoidal discrete sequence through a digital processing; and a plurality of D/A conversion means for D/A converting the sinusoidal discrete sequence generated by said sinusoidal-discrete-sequence generation section, to generate said plurality of carrier signal.

10. The magnetic bearing system as defined in claim 3 or 4 or 5 or 6, wherein said A/D conversion means is provided in plural number, wherein:

said detection means is operable, when said plurality of modulated signals include two or more modulated signals each having a carrier component with a common phase, to input said two or more modulated signals, respectively, into different ones of said plurality of A/D conversion means; and said different A/D conversion means are operable to A/D convert said two or more modulated signals at a common timing.

11. The magnetic bearing system as defined in claim 3 or 4 or 5 or 6, wherein:

said carrier generation means is operable to generate a plurality of carrier signals each having a different phase and a common frequency; and said detection means is operable to modulate said plurality of carrier signals in one-to-one correspondence to said plurality of control axes, and output a plurality of modulated signals.

* * * * *